Sept. 8, 1964 E. K. F. REZAEIH 3,147,813
APPARATUS FOR CONTINUOUS WEIGHING OF A MIXTURE
OF MUD AND DRILLING FLUID
Filed May 23, 1962 5 Sheets-Sheet 1
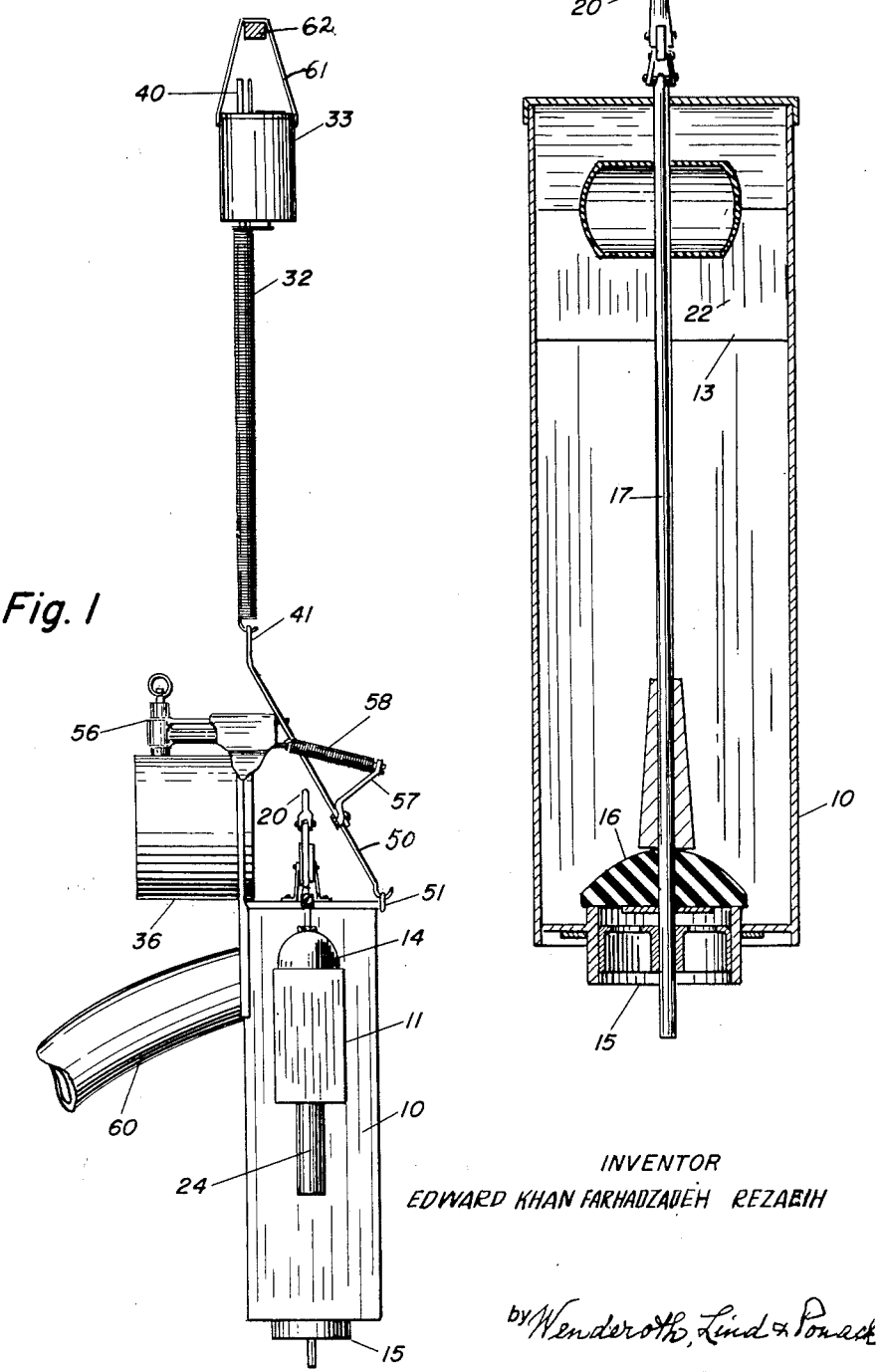
INVENTOR
EDWARD KHAN FARHADZADEH REZAEIH
by Wenderoth, Lind & Ponack
ATTORNEYS

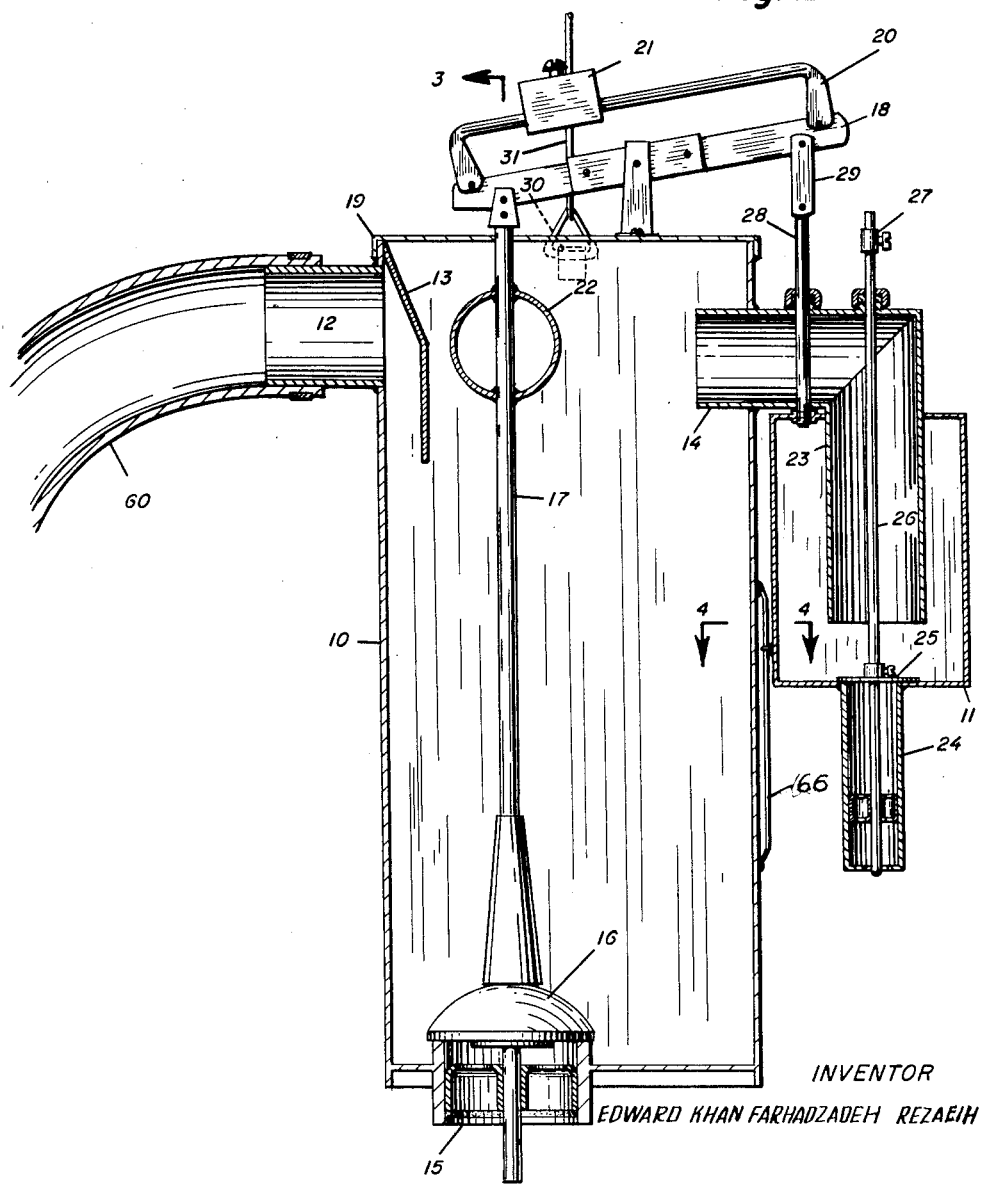

INVENTOR
EDWARD KHAN FARHADZADEH REZAEIH by
Wenderoth, Lind & Ponack
ATTORNEYS

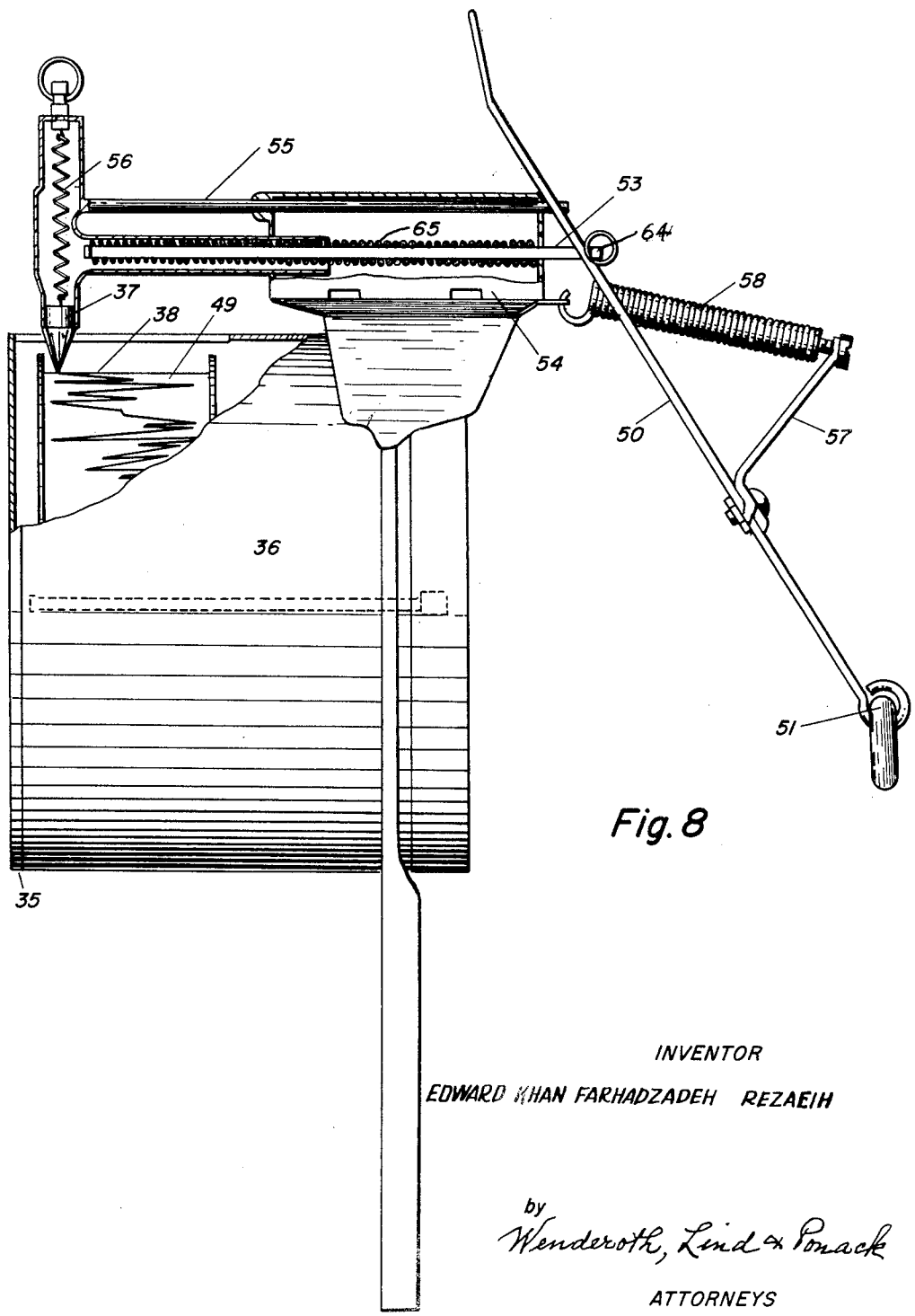

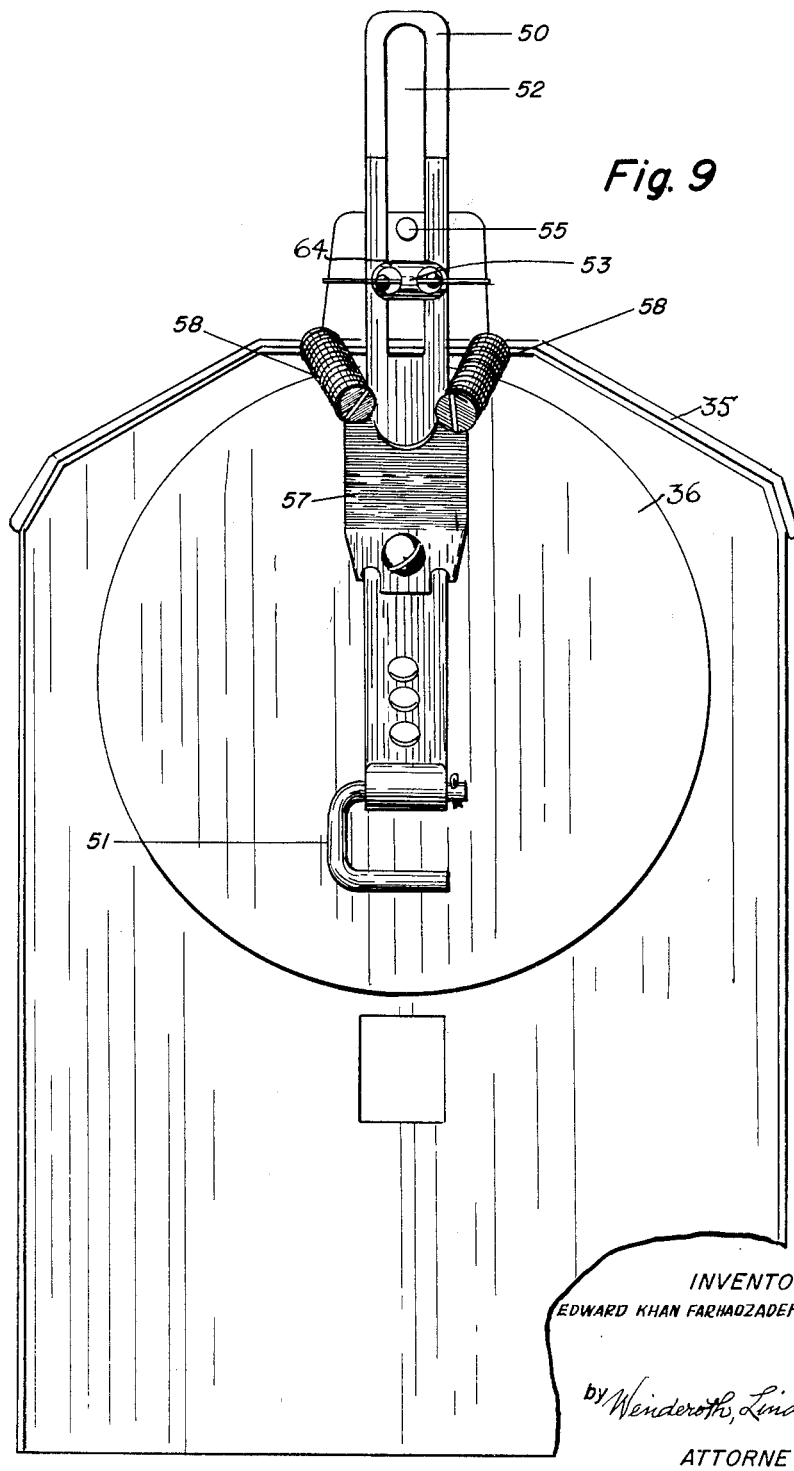

United States Patent Office 3,147,813
Patented Sept. 8, 1964

3,147,813
APPARATUS FOR CONTINUOUS WEIGHING OF A MIXTURE OF MUD AND DRILLING FLUID
Edward Khan Farhadzadeh Rezaeih, Ave. Amir Abad, Western Nosrat Ave. 69, Teheran, Iran
Filed May 23, 1962, Ser. No. 197,164
Claims priority, application Iran, Aug. 24, 1961, 4,537, Patent 4,196
8 Claims. (Cl. 177—1)

This invention relates to an apparatus for continuously weighing the mixture of mud and drilling fluid recovered at the time of drilling, and to the method of using same.

Formerly different methods were used for weighing samples of the mixture of mud and drilling fluid for determining the resistance and hardness of the ground under drilling, yet none of these methods, or the apparatus used therefore, permitted a continuous weighing, of such mixture nor a recording of the changes during the hours of drilling, in the weight of such mixtures. It is an object of the present invention to follow such changes continuously, during the entire period of the drilling, and to have the weights recorded continuously on strips of paper for examination.

With the above and other objects in view which will become apparent from the detailed description below, a preferred form of the invention is shown in the drawings in which:

FIGURE 1 is a side view of the entire apparatus including both the visual weight indicator and the recording weight indicator.

FIGURE 2 is a cross-sectional view with parts in elevation showing the cooperating reservoirs and attachments.

FIGURE 3 is a cross-sectional view taken upon section line 3—3 of FIGURE 2.

FIGURE 4 is a partial cross-sectional view taken upon section line 4—4 of FIGURE 2.

FIGURE 8 is a side view with parts in cross-section of the weight recording apparatus together with cooperating elements, and FIGURE 9 is an elevational view taken from the right hand side of FIGURE 8.

Figure 5:
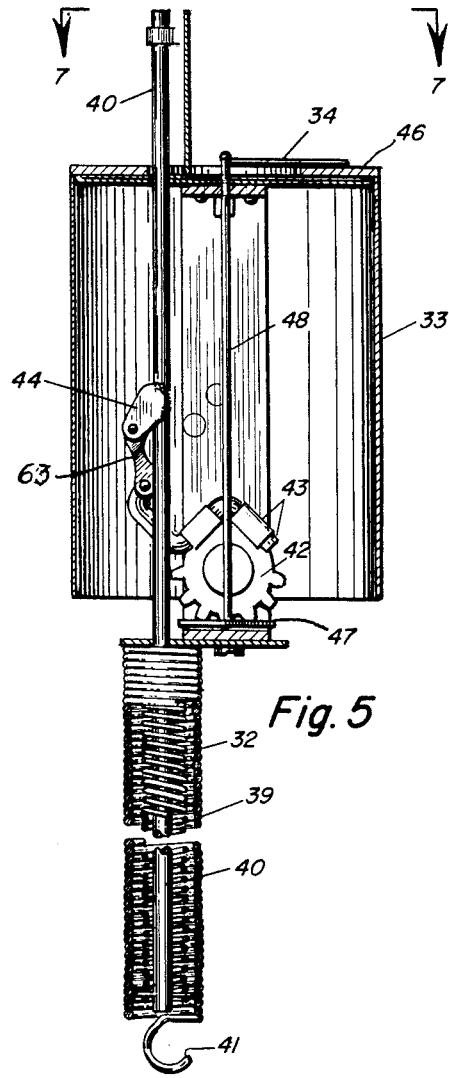
FIGURE 5 is a cross-sectional view through the visual weight indicating means with parts in elevation.

The invention comprises reservoirs 10 and 11 of different capacities. Reservoir 10 has one inlet 12 for receiving the mixture from the drilling operation which is protected at the inside by a pressure regulator shield or baffle plate 13 for directing the flow downwardly into the reservoir. Reservoir 10 has two outlets of which outlet 14 located near the top of the reservoir is always open, for leading the mixture into reservoir 11 when the mixture in reservoir 10 reaches the level of outlet 14.

The second outlet 15 is situated at the bottom of the reservoir 10 and is kept closed by a valve 16 pressed downwardly by a rod 17 whose upper end, situated outside the reservoir 10, is pivotally connected to a lever system 18 mounted on the tight lid 19 covering the upper end of reservoir 10.

The lever system 18 has a parallel branch 20 at the top on which a counterweight 21 slides. The counterweight is adjustable so that when the apparatus is empty the valve 16 keeps the reservoir 10 tightly closed. The rod 17 has a float 22 fixed thereto at its upper part within the reservoir 10, which helps the upward movement for opening the outlet 15 when the apparatus is to be emptied.

The outlet 14 leads the mixture into a smaller reservoir 11 through a long elbow 23, extending slidably into the reservoir 11 through a hole at the top so that reservoir 11 may freely slide up and down along the elbow's extension in the reservoir. The reservoir 11 has only one outlet 24 at its bottom, closed by a valve 25. This valve is held by a rod 26 which extends outside and through the elbow 23 and is adjustably located by a set screw 27 at its upper end so that when the apparatus is empty the valve 25 keeps the outlet 24 tightly closed.

On the top side of the reservoir 11 a rod 28 is firmly fixed and passes slidably through the elbow 23 and the other end of the rod 28 is connected pivotally to the other end of the lever system 18 by the link 29 so that any downward movement of the reservoir 11 will actuate the lever system 18 and will thus cause an upward movement of the rod 17 thereby opening the outlet 15 of the reservoir 10.

The upper lid of the reservoir 10 is provided with one or two hooks 30 to which a bail or wire 31 may be attached so that the apparatus may be hung to the lower end of a spring 32 connected to a weighing apparatus 33 having a visual signal only if such is desired. The weighing apparatus 33 is so adjusted that when both reservoirs are totally empty the indicator 34 on the weight dial indicates zero, and with the flow of the mixture into the reservoir 10 the indicator 34 starts indicating the increase in weight of the whole system until such time that both reservoirs are filled, when the outlets 15 and 24 are opened and the whole system is emptied.

Figure 6:
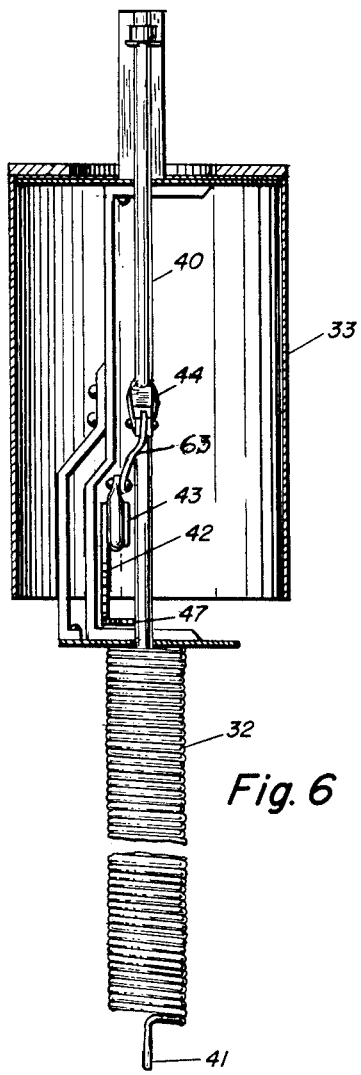
FIGURE 6 is a cross-sectional view of the elements shown in FIGURE 5 taken at right angles thereto.
Figure 7:
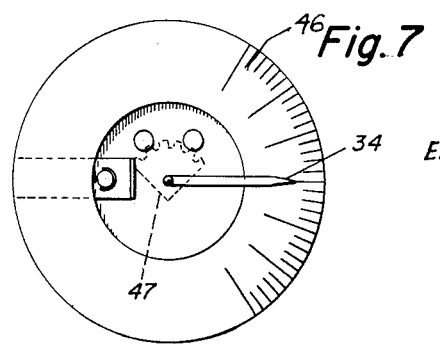
FIGURE 7 is a plan view taken upon section line 7—7 of FIGURE 5.

The apparatus has been provided with two different weight indicators. The weighing apparatus 33 is equipped with an indicator dial and pointer 34, see FIGURES 1, 5, 6 and 7, while the recording apparatus 35, see FIGURES 1, 8 and 9, is provided with a clockwork 36 and a pencil 37 to mark a moving strip of paper 38, to draw a graphic representation of the changes in the weight of the mixture for a laboratory study of the changes in 24 hours.

The weight indicator 33 is supported by a bail 61 from a fixed support such as the bar 62 and the spring 32 is fixed at its bottom and the entire apparatus comprising the reservoirs hang from the lower end of the spring 32 upon the hook 41 by the bail 31 when the weight indicator is to be used alone. Inside the spring 32 there is another spring 39 inside which there is a rod 40 so arranged that the lower end of the rod 40 and the internal spring 39 are connected to the lower part of the spring 32 with the upper part of the rod 40 being free to move up and down in the weighing apparatus 33.

The movements of the rod 40, caused by an increase or a decrease of the weight of the apparatus hanging on the hook 41 of the spring 32, are transmitted to a gear 42 by means of a steel bar 43 pivotally connected to a link 63 pivoted to a connection 44 fixed to rod 40 and a rotation of the gear 42 is transmitted to the pointer 34 of the dial indicator 46 by means of a horizontal gear segment 47 having fixed thereto a rod 48 to which the pointer 34 of the dial indicator 46 is fixed at the other end outside the upper end of the weighing apparatus 33.

The recording apparatus 35, for recordal of changes in the weights of the mixture, is provided with a clockwork 36 which makes the strip of paper 38, mounted on a cylinder 49 rotating as the hour hand of the clock, rotate a complete revolution every 12 hours. The weight recorder with its clockwork is fixed on the reservoir 10.

A lever 50 is pivoted to reservoir 10 by means of a hinge connection 51, the other end of the lever 50 being connected to the bottom hook 41 of the spring 32 of the weighing apparatus 33. The lever 50 is made of a flat piece of iron and has a slot 52 running through the middle of it, so that another rod 53 passing through the lever 50 slides easily along the length of the lever 50. The rod 53 passes through a casing 54, together with a parallel rod 55 so that the rod 53 cannot rotate at its end located in the slot 52 of the lever 50. The outer end of rod 53 is provided with a cross piece 64 which slides on lever 50.

At the other end of the rods 53 and 55 a pencil 37 has been perpendicularly mounted with a spring 56 maintaining the point of the pencil always in touch with the paper strip 38. The lever 50 has also secured thereto an elbow 57 at its lower part on which two springs 58 have been fixed so that the other end of the springs are connected to the fixed clockwork and the downward movement of the reservoir 10 and the reaction of the springs 58 produce a back and forth movement in the rod 53 and the displacement of the point of the pencil 37 on the paper strip, thus indicating the increase and decrease of the weight of the apparatus. A counterspring 65 cooperates with the rod 53 to return the pencil 37 upon upward movement of reservoir 10.

Operation of the apparatus is as follows:

The valves 15 and 25 are closed when the apparatus is not in operation, and when the reservoirs 10 and 11 are empty. A mixture of mud and drilling fluid coming from the well enters the reservoir 10 through the inlet 12 to which is connected a flexible plastic pipe 60 resting on a support immediately before the inlet. As soon as the reservoir 10 is filled the mixture passes to the reservoir 11 through the outlet 14. When the latter reservoir is filled to such as extent that the weight of the same can overcome the weight of the rod 17, the pressure brought on the valve 16 by the mixture on top of the same, and the counter weight 21, then the reservoir 11 moves downwardly on guide rods 66, thus opening the orifice of the outlet 24 for a discharge of the contents of the reservoir 11, and also pulling the rod 28, which in turn operates the lever system 18 and pulls up the rod 17, opening the orifice of the outlet 15 for a speedy discharge of the contents of the reservoir 10 which then moves upwardly closing outlets 15 and 24 simultaneously, and the apparatus returns to its normal position, both valves of outlets 15 and 24 being closed again, and the operation is resumed continuously. All during the operations the two weight indicators show in fair precision the change in the weight of the mixture of mud and drilling fluid, for immediate action as well as for office analysis, if required.

It is thought that the invention and its advantages will be understood from the foregoing description and it is apparent that various changes may be made in the process, form, construction and arrangement of the parts without departing from the spirit and scope of the invention or sacrificing its material advantages, the forms hereinbefore described and illustrated in the drawings being merely a preferred embodiment thereof.

I claim:

1. An apparatus for continuously observing the differences occurring in the specific gravity of the mud recovered from drilling operations comprising a first reservoir receiving a continuous flow of fluid to be weighed, a second reservoir supplied with fluid from said first reservoir when filled, means for weighing said reservoirs, means for emptying said fluid from said reservoirs, and means controlled by said second reservoir for operating said emptying means.

2. An apparatus for continuously observing the differences occurring in the specific gravity of the mud recovered from drilling operations comprising a first reservoir receiving a continuous flow of fluid to be weighed, a second reservoir supplied with fluid from said first reservoir when filled, means for weighing said reservoirs, means for recording said weight, means for emptying said fluid from said reservoirs and means controlled by said second reservoir for operating said emptying means.

3. An apparatus for continuously observing the differences occurring in the specific gravity of the mud recovered from drilling operations comprising a first reservoir receiving a continuous flow of fluid to be weighed, a second reservoir supplied with fluid from said first reservoir when filled, means for weighing said reservoirs, a valve upon said first reservoir for emptying said reservoir, said second reservoir being movable relative to said first reservoir upon being filled with fluid, and means controlled by said second reservoir for operating said valve.

4. An apparatus for continuously observing the differences occurring in the specific gravity of the mud recovered from drilling operations comprising a first reservoir receiving a continuous flow of fluid to be weighed, a second reservoir supplied with fluid from said first reservoir when filled, means for weighing said reservoirs, valves located at the bottom of said reservoirs for emptying said reservoirs, said second reservoir being movable relative to said first reservoir upon being filled with fluid, and means controlled by the movement of said second reservoir for opening said valves and emptying said reservoirs.

5. An apparatus for continuously observing the differences occurring in the specific gravity of the mud recovered from drilling operations comprising a first reservoir receiving a continuous flow of fluid to be weighed, a second reservoir supplied with fluid from said first reservoir when filled, a weight scale from which said reservoirs hang to weigh the increase in weight due to said fluid, means for emptying said fluid from said reservoirs and means controlled by said second reservoir for operating said emptying means.

6. An apparatus for continuously observing the differences occurring in the specific gravity of the mud recovered from drilling operations comprising a first reservoir receiving a continuous flow of fluid to be weighed, a second reservoir supplied with fluid from said first reservoir when filled, a weight scale from which said reservoirs hang to weigh the increase in weight due to said fluid, means for recording changes in weight also hanging from said scale, means for emptying said fluid from said reservoirs and means controlled by said second reservoir for operating said emptying means.

7. An apparatus for continuously observing the differences occurring in the specific gravity of the mud recovered from drilling operations comprising a first reservoir receiving a continuous flow of fluid to be weighed, a second reservoir supplied with fluid from said first reservoir when filled, a weight scale from which said reservoirs hang to weigh the increase in weight due to said fluid, means for recording changes in weight also hanging from said scale, said recording means comprising a clockwork moving a strip of paper and a pencil movable by the movement of said first reservoir inscribing a graph upon said paper.

8. A method of continuously analyzing the mixture of mud and drilling fluid during drilling comprising the steps of continuously supplying said fluid to a pair of containers, continuously weighing said containers and automatically emptying said containers upon reaching a predetermined volume in one of said containers and a predetermined weight in the other of said containers.

References Cited in the file of this patent

UNITED STATES PATENTS

| | | |
|---|---|---|
| 408,450 | Bachelder et al. | Aug. 6, 1889 |
| 1,084,658 | Pearson | Jan. 20, 1914 |
| 1,633,623 | Boulogne | June 28, 1927 |
| 1,978,558 | Von Pritzelwitz Der Horst | Oct. 30, 1934 |
| 2,252,014 | Lupfer | Aug. 12, 1941 |
| 2,679,374 | Mylting | May 25, 1954 |
| 2,692,755 | Nowak | Oct. 26, 1954 |
| 2,717,142 | Murray | Sept. 6, 1955 |
| 2,883,856 | Youngman | Apr. 28, 1958 |
| 2,923,151 | Engle et al. | Feb. 2, 1960 |